US 6,661,759 B1

United States Patent
Seo

(10) Patent No.: US 6,661,759 B1
(45) Date of Patent: Dec. 9, 2003

(54) ADAPTIVE RECORDING METHOD AND APPARATUS FOR HIGH-DENSITY OPTICAL RECORDING, AND CONTROL METHOD THEREFOR

(75) Inventor: Jin-gyo Seo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 639 days.

(21) Appl. No.: 09/597,994

(22) Filed: Jun. 19, 2000

(30) Foreign Application Priority Data

Jun. 18, 1999 (KR) .......................... 1999-22916

(51) Int. Cl.⁷ .............................................. G11B 7/00
(52) U.S. Cl. .................................... 369/59.11; 369/116
(58) Field of Search ........................ 369/44.13, 44.26, 369/44.37, 47.28, 47.3, 47.51, 53.26, 53.34, 53.41, 59.11, 59.12, 59.13, 59.15, 59.2, 59.26, 59.27, 116

(56) References Cited

U.S. PATENT DOCUMENTS

| | | | |
|---|---|---|---|
| 5,029,155 A | 7/1991 | Kenjo | |
| 5,185,734 A | 2/1993 | Call et al. | |
| 5,268,893 A | 12/1993 | Call et al. | |
| 5,490,126 A * | 2/1996 | Furumiya et al. | 369/59.12 |
| 5,640,381 A | 6/1997 | Call et al. | |
| 5,732,055 A | 3/1998 | Masaki et al. | |
| 5,790,491 A * | 8/1998 | Jaquette et al. | 369/116 |
| 5,802,031 A * | 9/1998 | Clark et al. | 369/59.11 |
| 5,887,010 A | 3/1999 | Arai | |
| 6,104,685 A * | 8/2000 | Saga et al. | 369/59.11 |
| 6,115,338 A | 9/2000 | Masaki et al. | |
| 6,222,814 B1 * | 4/2001 | Ichimura | 369/116 |
| 6,236,635 B1 | 5/2001 | Miyamoto et al. | |
| 6,510,116 B1 * | 1/2003 | Miyagawa et al. | 369/59.12 |
| 2001/0043538 A1 | 11/2001 | Miyamoto et al. | |
| 2002/0054556 A1 | 5/2002 | Miyamoto et al. | |

FOREIGN PATENT DOCUMENTS

| | | |
|---|---|---|
| EP | 0430649 A2 | 6/1991 |
| EP | 0446892 A2 | 9/1991 |
| EP | 0467616 A2 | 1/1992 |
| EP | 0532241 A2 | 3/1993 |
| EP | 0559391 A2 | 9/1993 |
| EP | 0803866 A2 | 12/1996 |
| EP | 0902424 A1 | 3/1999 |
| JP | hei7-105563 | 4/1995 |
| JP | 8-7282 | 12/1996 |
| JP | 9-180195 | 7/1997 |
| JP | 9-293259 | 11/1997 |
| JP | 11-73667 | 3/1999 |
| JP | 11-86291 | 3/1999 |
| WO | WO93/26001 | 12/1993 |
| WO | WO 02/23576 A1 | 3/2002 |

OTHER PUBLICATIONS

*Notice to Submit Response* issued by the Korean Industrial Property Office dated Mar. 27, 2001.
"*Notification of the Reasons for Objection*" issued by Japanese dated on Apr. 22, 2003 in corresponding co–pending Japanese patent application 2000–181812.

* cited by examiner

*Primary Examiner*—Thang V. Tran
*Assistant Examiner*—Bach Vuong
(74) *Attorney, Agent, or Firm*—Robert E. Bushnell, Esq.

(57) ABSTRACT

There is provided an adaptive recording method for recording binary data having marks and spaces by irradiating a light signal onto an optical recording medium and adaptively adjusting the power of the light signal according to the correlativity between the length of a mark currently being recorded and the lengths of leading/trailing spaces, the adaptive recording method including the steps of (a) checking the output characteristics of a light signal generating apparatus for generating the light signal, and (b) controlling the power of the light signal by referring to the power of the light signal corresponding to the correlativity and the output characteristics in recording the data on the optical recording medium. The adaptive recording method allows accurate recording control by updating light output control data with respect to a power setting value according to variation in the output characteristic of the laser diode.

31 Claims, 7 Drawing Sheets

FIG. 4
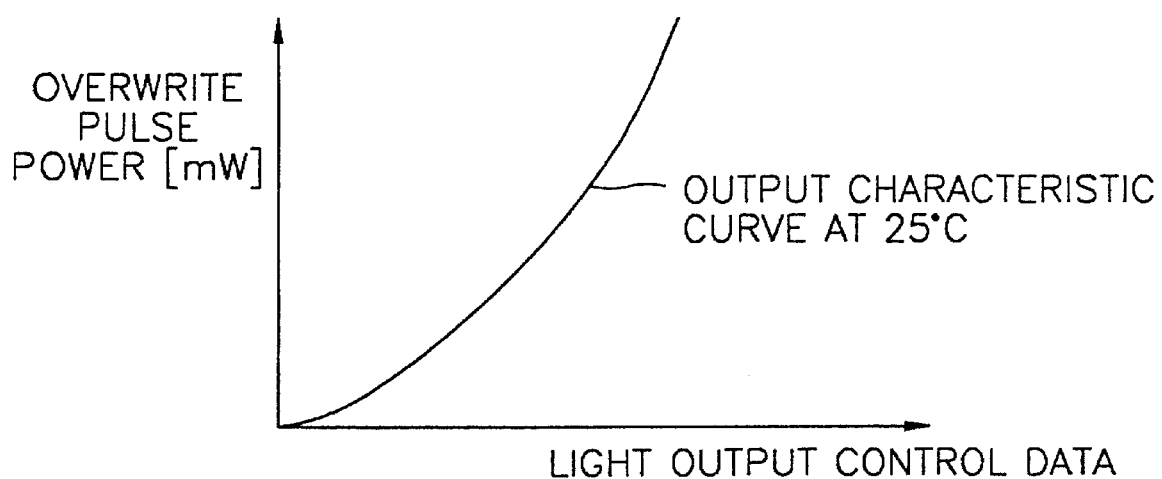
(a)
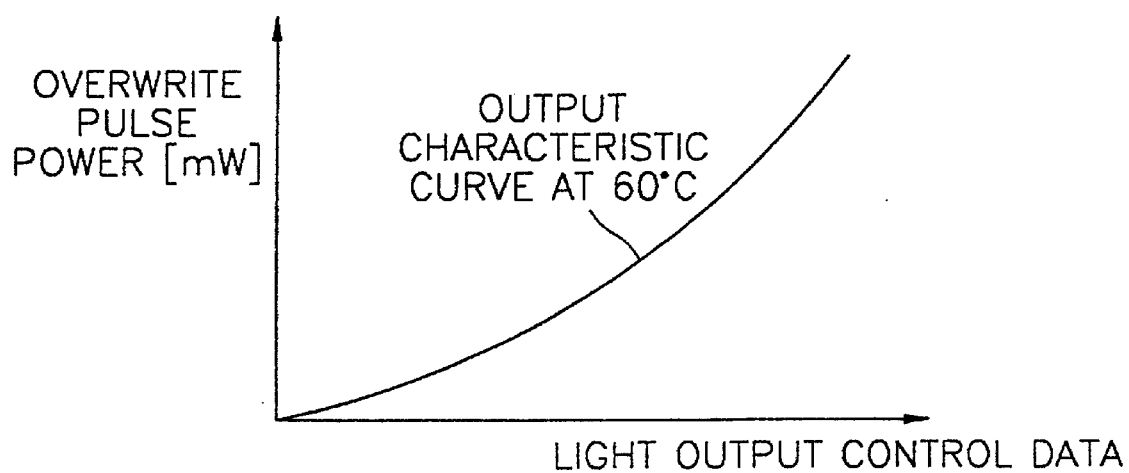
(b)

| RECORDING MARK-TRAILING SPACE | POWER SETTING VALUE |
|---|---|
| G₁ – G₁ | 10mW |
| G₁ – G₂ | 10.2mW |
| ⋮ | ⋮ |
| G₄ – G₄ | 120mW |

(a)

| RECORDING MARK-TRAILING SPACE | LIGHT OUTPUT CONTROL DATA |
|---|---|
| G₁ – G₁ | 120 |
| G₁ – G₂ | 125 |
| ⋮ | ⋮ |
| G₄ – G₄ | 140 |

(b)

ADAPTIVE RECORDING METHOD AND APPARATUS FOR HIGH-DENSITY OPTICAL RECORDING, AND CONTROL METHOD THEREFOR

CLAIM OF PRIORITY

This application makes reference to, incorporates the same herein, and claims all benefits accruing under 35 U.S.C. §119 from an application for ADAPTIVE RECORDING METHOD FOR HIGH DENSITY OPTICAL RECORDING, CONTROL METHOD THEREFOR, AND APPARATUS THEREFOR earlier filed in the Korean Industrial Property Office on the $18^{th}$ of June 1999 and there duly assigned Serial No. 22916/1999.

BACKGROUND OF THE INVENTION

1. Technical Field

The present invention relates to a high-density optical recording method and apparatus, and more particularly, to an adaptive recording method and apparatus for implementing optimum recording, and a controlling method therefor.

2. Related Art

With the advent of the multi-media age, there has been an increasing demand for high-capacity recording media. Such high-capacity recording media include optical recording media such as a magnetic optical disc driver (MODD) or digital versatile disc random access memory (DVD-RAM).

In recording data on such optical recording media, a high-level of accuracy is required. I have found that it would be desirable to improve the accuracy of optical recording, because inaccuracy is a significant problem.

SUMMARY OF THE INVENTION

To solve the above problems, it is an object of the present invention to provide an adaptive recording method adaptive to a variation in the output characteristics of a laser diode.

Another object of the present invention is to provide an adaptive recording apparatus which enables accurate recording, wherein the recording is adaptive to a variation in the output characteristics of a laser diode.

It is still another object of the present invention to provide a controlling method which enables accurate recording by controlling the adaptive recording apparatus adaptively to a variation in the output characteristics of a laser diode.

Accordingly, to achieve the first object, there is provided an adaptive recording method for recording binary data having marks and spaces by irradiating a light signal onto an optical recording medium and adaptively adjusting the power of the light signal according to the correlativity between the length of a mark currently being recorded and the lengths of leading/trailing spaces, the adaptive recording method including the steps of (a) checking the output characteristics of a light signal generating apparatus for generating the light signal, and (b) controlling the power of the light signal by referring to the power of the light signal corresponding to the correlativity and the output characteristics in recording the data on the optical recording medium.

Here, the step (a) includes the sub-steps of (a1) obtaining first reference light output control data for outputting a light signal having a first reference power from the light signal generating apparatus, (a2) obtaining second reference light output control data for outputting a light signal having a second reference power from the light signal generating apparatus, and (a3) approximating the output characteristics of the light signal generating apparatus by referring to the first reference power, the first reference light output control data, the second reference power and the second reference light output control data.

Also, the sub-steps (a1) and (a2) are preferably performed in an area of the optical recording medium where user data is not recorded.

To achieve the second object, there is provided an adaptive recording apparatus including a recording waveform generator for generating an overwrite pulse control signal corresponding to binary data having marks and spaces, a laser diode driver for controlling a laser diode to generate overwrite pulses corresponding to the overwrite pulse control signal and controlling the power of the overwrite pulses according to light output control data, an auto laser diode power control (ALPC) circuit for feed-back controlling the power of the overwrite pulses to be maintained at a predetermined reference value, a data determiner for determining the correlativity between the recording mark and leading/trailing space, a first power table storing unit for storing the light output control data corresponding to the power of the overwrite pulse depending on the correlativity, an operator for obtaining the output characteristic curve of the laser diode by referring to first reference light output control data and second reference light output control data, and outputting the corresponding light output control data according to the output characteristic curve, a second power table storing unit for storing the light output control data obtained by the operator, and a multiplexer for selectively supplying the light output control data output from the ALPC circuit or the second power table storing unit to the laser diode driver, the adaptive recording apparatus for adaptively adjusting the power of the overwrite pulse according to the correlativity between the length of the recording mark and the lengths of the leading/trailing spaces.

To achieve the second object, there is provided a method for controlling an adaptive recording apparatus including a recording waveform generator for generating an overwrite pulse control signal corresponding to binary data having marks and spaces; a laser diode driver for controlling a laser diode to generate overwrite pulses corresponding to the overwrite pulse control signal and for controlling the power of the overwrite pulses according to light output control data; an auto laser diode power control (ALPC) circuit for feed-back controlling the power of the overwrite pulses to be maintained at a predetermined reference value; a data determiner for determining the correlativity between the recording mark and leading/trailing space; a power table storing unit for storing the light output control data corresponding to the power of the overwrite pulse depending on the correlativity and outputting the corresponding light output control data according to the determined correlativity; and a multiplexer for selectively supplying the light output control data output from the power table storing unit to the laser diode driver, the adaptive recording apparatus for adaptively adjusting the power of the overwrite pulse according to the correlativity between the length of the recording mark and the lengths of the leading/trailing spaces, the method including the steps (g) checking the output characteristic curve of the laser diode by controlling the ALPC circuit, and (h) updating the light output control data stored in the power table storing unit by referring to the output characteristic curve.

Here, the step (g) includes the sub-steps of: (g1) applying to the ALPC circuit a first reference value for allowing the overwrite pulse to have a first power, and obtaining first reference light output control data corresponding thereto, (g2) applying to the ALPC circuit a second reference value for allowing the overwrite pulse to have a second power, and obtaining second reference light output control data corresponding thereto, (g3) approximating the output characteristics of the light signal generating apparatus by referring to the first power, the first light output control data, the second power and the second light output control data.

Also, the sub-steps (g1) and (g2) are preferably performed in an area of the optical recording medium where user data is not recorded.

To achieve these and other objects in accordance with the principles of the present invention, as embodied and broadly described, the present invention provides a method, comprising: recording binary data corresponding to marks and spaces on an optical recording medium, said recording comprising: irradiating a light signal onto the optical recording medium and adjusting power of said light signal in dependence upon a relationship between at least two of a mark being recorded, a leading space preceding said mark, and a trailing space following said mark.

To achieve these and other objects in accordance with the principles of the present invention, as embodied and broadly described, the present invention provides a method of writing binary data to an optical recording medium, comprising: controlling an adaptive recording apparatus including a recording waveform generator generating an overwrite pulse control signal corresponding to said binary data having marks and space, a laser diode driver regulating a laser diode to generate overwrite pulses corresponding to said overwrite pulse control signal and for controlling the power of the overwrite pulses according to light output control data, an auto laser diode power control circuit feed-back regulating said power of said overwrite pulses to be maintained at a predetermined reference value; a data determiner determining a correlativity between at least two of a mark being recorded, a leading space, and a trailing space, a power table storing unit storing light output control data corresponding to said power of said overwrite pulses in dependence upon said determined correlativity and outputting said corresponding light output control data.according to said determined correlativity, and a multiplexer selectively supplying said light output control data output from a power table storing unit to said laser diode driver, said adaptive recording apparatus adaptively adjusting said power of said overwrite pulses according to said determined correlativity between at least two of a length of said mark, a length of said leading space, and a length of said trailing space, said controlling further comprising: detecting output characteristic data of said laser diode by regulating said auto laser diode control circuit and updating said light output control data stored in said power table storing unit in dependence upon said output characteristic data of said laser diode.

To achieve these and other objects in accordance with the principles of the present invention, as embodied and broadly described, the present invention provides an adaptive recording apparatus recording data on an optical recording medium binary, comprising: a recording waveform generator for generating an overwrite pulse control signal corresponding to said binary data having marks and spaces, a laser diode outputting light, a laser diode driver for controlling said laser diode to generate overwrite pulses corresponding to said overwrite pulse control signal and controlling power of said overwrite pulses according to light output control data, an auto laser diode power control circuit for feed-back controlling said power of said overwrite pulses to be maintained at a predetermined reference value, a data determiner for determining a correlativity between at least two of a mark to be recorded, a leading space preceding said mark, and a trailing space following said mark, a first power table storing unit for storing said light output control data corresponding to said power of t said overwrite pulses depending on said determined correlativity, an operator for obtaining output characteristic data laser diode in dependence upon first reference light output control data and second reference light output control data, and outputting light output control data said output characteristic data, a second power table storing unit for storing said light output control data output by said operator and a multiplexer for selectively supplying light output control data output from one of said auto laser diode power control circuit and said second power table storing unit to said laser diode driver, said apparatus adaptively adjusting said power of said overwrite pulse according to said correlativity between at least two of a length of said e recording mark, a length of said leading space, and a length of said trailing space.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIG. 4 shows graphs illustrating the dependance of the output characteristics of a laser diode on the operating temperature;

DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

When data is recorded onto optical recording media such as a magnetic optical disc driver (MODD) or a digital versatile disc random access memory (DVD-RAM), a high level of accuracy is required. Also, it is necessary to minimize jitter and a cross-erase. In order to comply with such needs, adaptive recording methods have been employed.

In an adaptive recording method, optimum recording is realized by adjusting a laser output or moving the positions of overwrite pulses according to the correlativity between the lengths of the overwrite pulses and the lengths of leading and trailing spaces.

However, the output characteristics of a laser diode for generating overwrite pulses vary with the passage of time. During an initial operating stage, the output power levels of the laser diode sharply vary in response to variations in the input power. However, during a stable operating stage (in which the operating temperature is relatively high), variations in the output power levels of the laser diode become considerably slow with respect to variations in the input power. Thus, in order to control the laser diode with a constant light power level, a sharp variation in the current is necessary.

However, when an adaptive recording apparatus is independent of the variation in the output power level of the laser diode, it is difficult to realize optimum recording.

The structure and operation of an adaptive recording apparatus, which operates independently of the variation in the output power of the laser diode, will now be described in detail with reference to the accompanying drawings.

Figure 1:
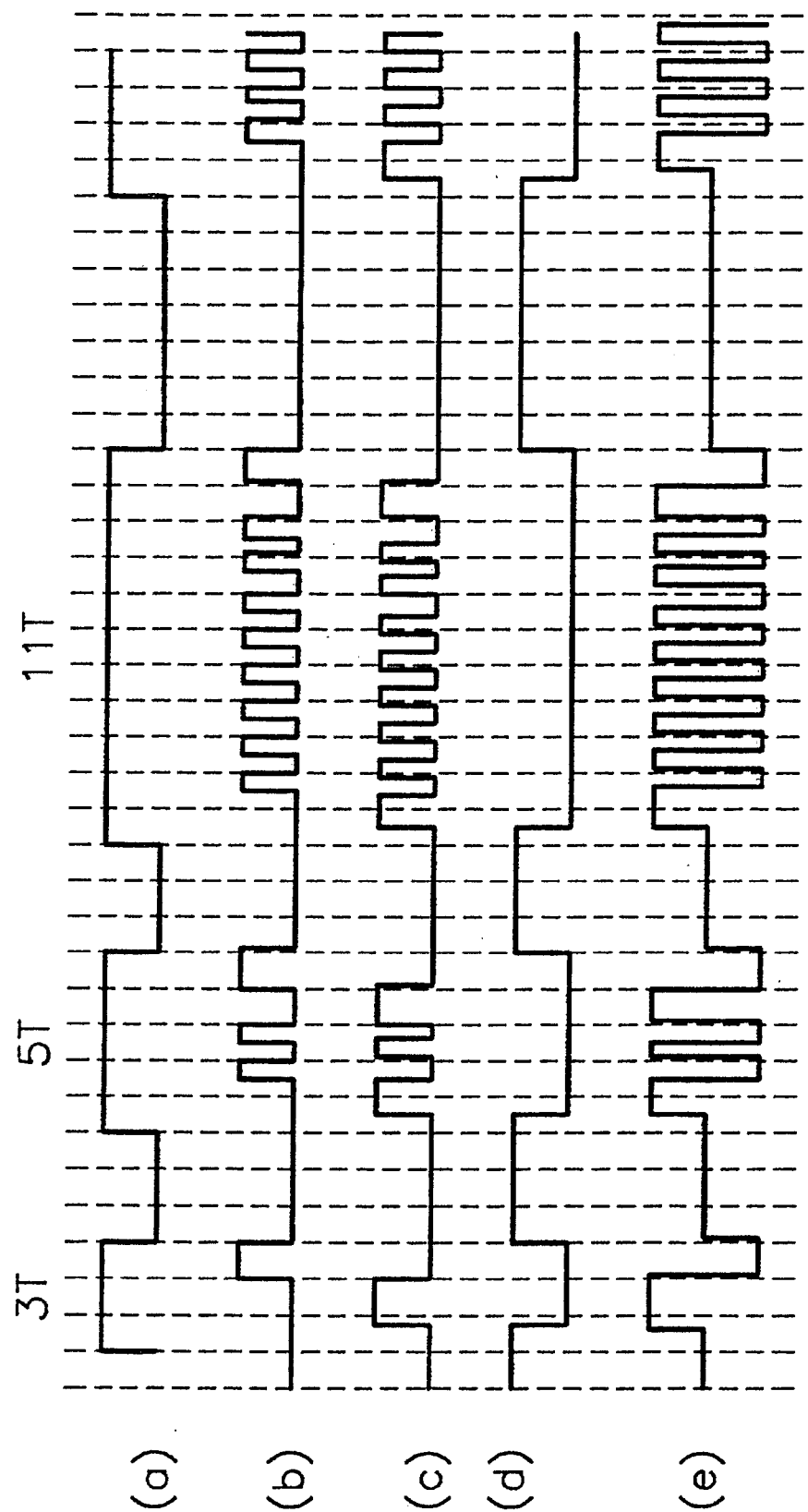
FIG. 1 shows waveform diagrams illustrating overwrite pulses for forming recording marks in a digital versatile disc random access memory (DVD-RAM)

In a DVD-RAM, data is recorded using overwrite pulses of a multi-pulse pattern. FIG. 1 shows waveform diagrams illustrating overwrite pulses for forming recording marks in a digital versatile disc random access memory (DVD-RAM). FIG. 1(*a*) shows NRZI (Non Return to Zero Inverted) data having recording marks of 3T, 5T and 11T (Here, T is the period of a basic clock signal.), and FIG. 1(*e*) shows overwrite pulses for recording the data shown in FIG. 1(*a*) on a disc. The overwrite pulses shown in FIG. 1(*e*) are obtained by combination of a read power control signal shown in FIG. 1(*b*), a write power control signal shown in FIG. 1(*c*), and a bias power control signal in FIG. 1(*d*).

The overwrite pulses shown in FIG. 1 are based on the 2.6 giga-byte (GB) DVD-RAM standard. According to the 2.6 GB DVD-RAM standard, the overwrite pulses consist of a first pulse, a multi-pulse chain and a last pulse. The number of pulses in the multi-pulse chain changes according to the length of a recording mark, while the first and last pulses are retained as they are.

The rising edge of the first pulse lags the rising edge of the recording mark by T/2. The rising edge of the first pulse may be shifted before and after, in units of 1 nano second (ns). This is also true of the last pulse. The multi-pulse chain is divided into several short pulses so that the recording marks may not be deformed in the rear part of the recording marks by reducing heat accumulation.

The overwrite pulses based on the 2.6 GB DVD-RAM standard are formed independently of correlativity between a current recording mark, a leading space and a trailing space.

Thus, when short spaces are seriated in the data having a long recording mark, deformation of the recording mark due to chain accumulation occurs in the rear part of the recording mark, which causes severe jitter.

To prevent this problem, an adaptive recording method is employed. The adaptive recording method allows optimum recording to be realized by adjusting the levels of overwrite pulses or moving the positions thereof according to the correlativity between a recording mark, a leading space and a trailing space.

Figure 2:
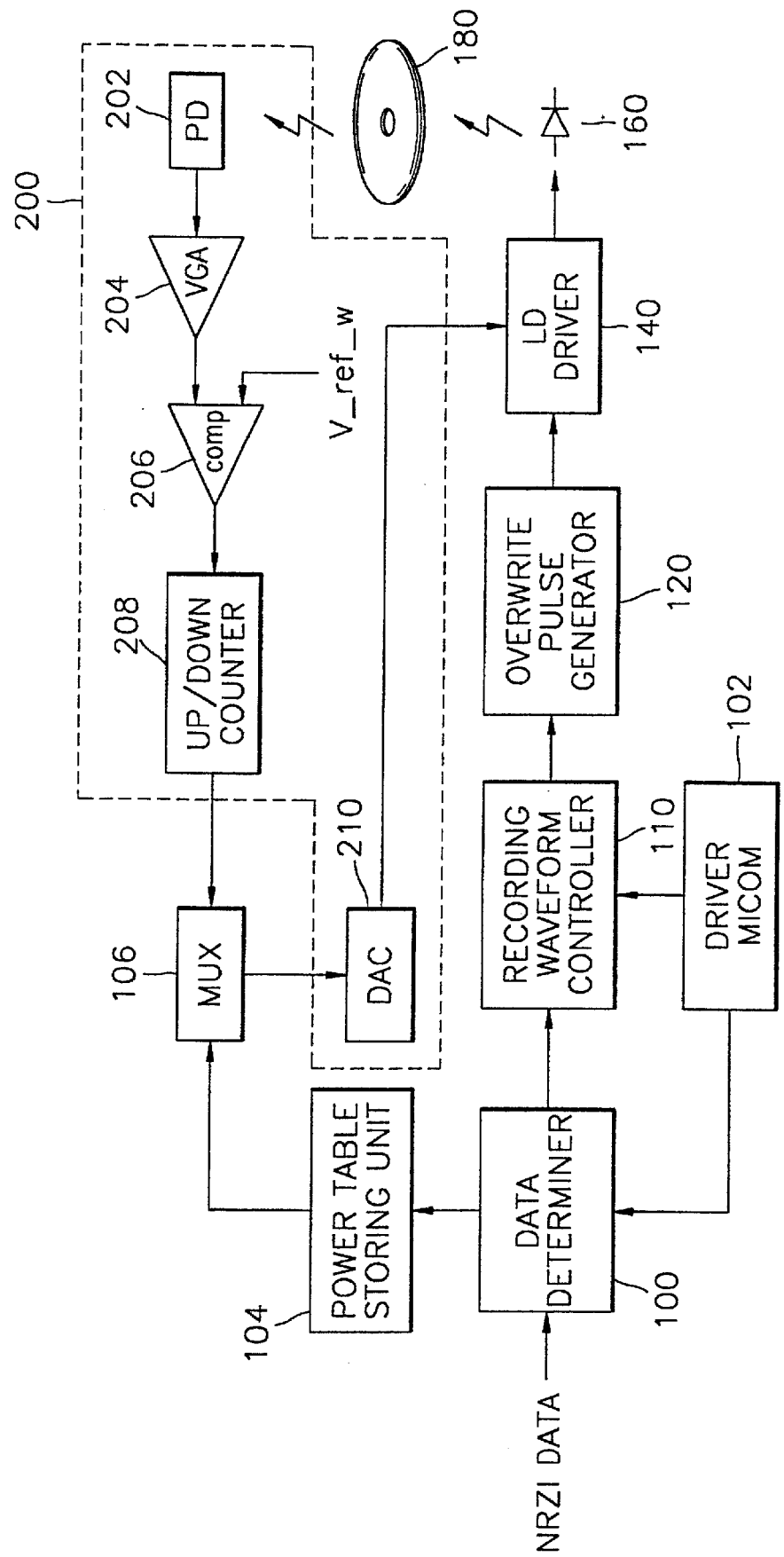
FIG. 2 is a block diagram illustrating an adaptive recording apparatus.

FIG. 2 is a block diagram of an adaptive recording apparatus for adjusting the levels of overwrite pulses irrespective of a current recording mark, a leading space and a trailing space.

The adaptive recording apparatus shown in FIG. 2 includes a data determiner 100, a recording waveform controller 110, an overwrite pulse generator 120, a laser diode (LD) driver 140, a laser diode 160, an auto laser diode power control (ALPC) circuit 200, a driver microcomputer (MICOM) 102, a power table storing unit 104, and a multiplexer (MUX) 106.

The ALPC circuit 200 includes a photo diode (PD) 202, a variable gain controller (VGA) 204, a comparator (comp) 206, an up/down counter 208 and a digital-to-analog converter (DAC) 210, and performs an auto laser diode power control (ALPC) operation for maintaining the level of a light signal output from the LD 160, which is output as a function of PD 202 at a constant level.

Figure 3:
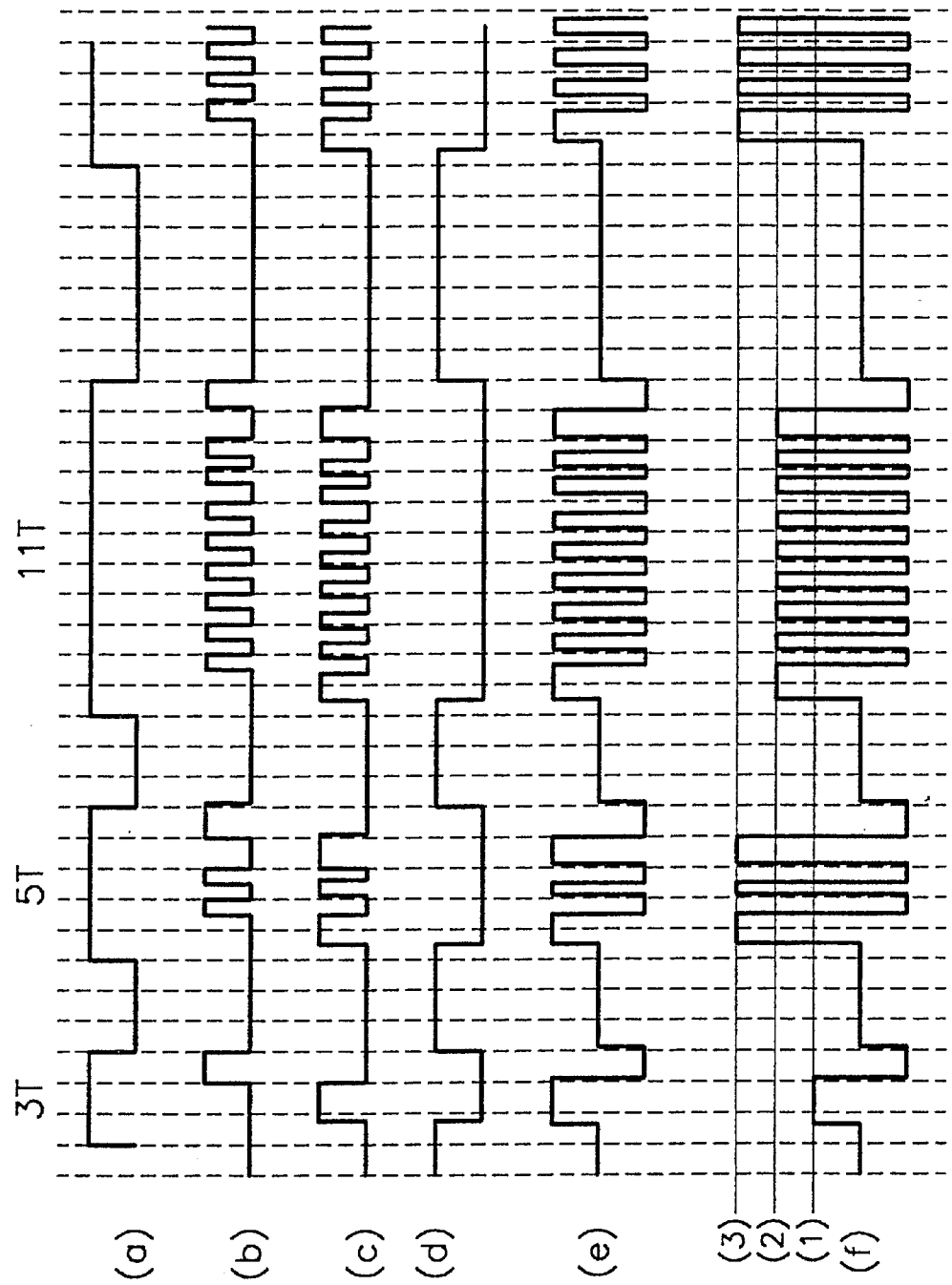
FIG. 3 shows waveform diagrams illustrating the operation of the adaptive recording apparatus shown in FIG. 2.

FIG. 3 shows waveform diagrams illustrating the operation of the adaptive recording apparatus shown in FIG. 2. FIG. 3(*a*) shows the waveform of NRZI data, FIG. 3(*b*) shows a read power control signal, FIG. 3(*c*) shows a write power control signal, FIG. 3(*d*) shows a bias power control signal, FIG. 3(*e*) shows overwrite pulses based on the 2.6 GB DVD-RAM, and FIG. 3(*f*) shows overwrite pulses according to the adaptive recording method.

As shown in FIG. 3(*f*), according to the adaptive recording method, the levels of overwrite pulses are changed into levels (1), (2) and (3) depending on the correlativity between the recording mark and leading/trailing spaces.

The adaptive recording apparatus shown in FIG. 2 operates in a normal recording mode or an adaptive recording mode. In the normal recording mode, the levels of the overwrite pulses are controlled by light output control data supplied from the up/down counter 208 of the ALPC circuit 200. Here, a reference voltage V_ref_w supplied from the driver micom 102 is applied to the comparator 206.

The light signal reflected from the disc 180 is received in the PD 202 which is a light receiving element. The VGA 204 amplifies the light signal received in the PD 202. The comparator 206 compares the level of a voltage output from the VGA 204 and that of the reference voltage V_ref_w.

Here, the reference voltage V_ref_w is set according to the power of a write pulse required in a normal recording mode. The up/down converter 208 down-counts if the level of the light signal is higher than the reference voltage V_ref_w, and up-counts if the level of the light signal is lower than the reference voltage V_ref_w.

The counting result of the up/down counter 208 is light output control data and is supplied to the LD driver 140 through the DAC 210. In the normal recording mode, the MUX 106 supplies the light output control data output from the up/down counter 208 to the DAC 210.

Alternatively, in the adaptive recording mode, the levels of overwrite pulses are controlled by the light output control data stored in the power table storing unit 104.

The operation of the adaptive recording apparatus shown in FIG. 2 in the adaptive recording mode will now be described in detail. In FIG. 2, the power table storing unit 104 stores a power table including power setting values of overwrite pulses, wherein the power setting values depend on the correlativity between a recording mark and leading/trailing spaces.

The power table storing unit 104 is initialized by the driver micom 102. During an initializing stage, the driver micom 102 reads power setting values of a control data zone, which are recorded in read-in/out zones, and stores the same in the power table storing unit 104.

According to the 2.6 GB DVD-RAM standards, the power setting values for designating a read power level, a write power level, a bias power level, an erase power level and a cooling power level are recorded in the control data zone. Actually, the write power level, the bias power level, the erase power level and the cooling power level are separately recorded for each land/groove. Thus, 9 power setting values are recorded in the control data zone.

In order to perform adaptive recording on the disc 180 based on the 2.6 GB DVD-RAM standards, separate data for changing the power setting values depending on the correlativity between the recording mark and the leading/trailing spaces thereof is necessary. The data depending on the correlativity may be stored in a flash read only memory (ROM) of a driver or may be transferred through a host computer. Therefore, the driver micom 102 controls the power setting values stored in the control data zone of the disc 180 and the power setting values that depend on the correlativity, which are stored in the flash ROM, to be stored in the power table storing unit 104.

To cope with adaptive recording, the power setting values depending on the correlativity may be stored in the disc 180. In this case, the driver micom 102 transfers the power setting values recorded in the control data zone of the disc 180 to be stored in the power table storing unit 104.

More specifically, in initializing the power table storing unit 104, the driver micom 102 converts the power setting values into binary data suitable for the DAC 210. In other words, the light output control data necessary for generating overwrite pulses, which has a power level designated by the power setting values, is stored in the power table storing unit 104. The light output control data stored in the power table storing unit 104 may vary according to the resolution of the DAC 210 even for an identical power setting value.

In performing adaptive recording, the LD driver 140 operates in accordance with the light output control data supplied from the power table storing unit 104. In other words, the LD driver 140 controls the power level of the overwrite pulse output from the LD 160 in accordance with the light output control data supplied from the power table storing unit 104.

In the adaptive recording mode, the MUX 106 selects the light output control data supplied from the power table storing unit 104 and supplies the same to the DAC 210.

The data determiner 100 receives NRZI data, determines the correlativity between the recording mark and the leading/trailing spaces and then supplies the determination result to the power table storing unit 104. The power table storing unit 104 supplies the light output control data depending on the correlativity to the MUX 106 by referring to the determination result supplied from the data determiner 100.

The light output control data supplied from the power table storing unit 104 is supplied to the LD driver 140 through the DAC 210, and the LD driver 140 controls the power level of the LD 160 according to the light output control data supplied from the DAC 210.

The driver micom 102 initializes the power table storing unit 104. The recording waveform controller 110 outputs recording waveform control signals, that is, a read power control signal shown in FIG. 3(b), a write power control signal shown in FIG. 3(c) and a bias power control signal shown in FIG. 3(d), according to NRZI data shown in FIG. 3(a).

The overwrite pulse generator 120 generates overwrite pulses shown in FIG. 3(e), according to recording waveform control signals supplied from the recording waveform controller 110, and applies the same to the LD driver 140.

The LD driver 140 drives the LD 160 according to the overwrite pulses applied thereto and the light output control data supplied from the DAC 210. The overwrite pulses supplied to the LD 160 are flashed onto the disc 180 to perform recording of data.

The power levels of the overwrite pulses vary adaptively according to the correlativity between the recording mark and the leading/trailing spaces, as shown in FIG. 3(f). In FIG. 3(f), the power level (1) represents a power level at the mark of 3T with a trailing space of 3T, the power level (2) represents a power level at the mark of 11T with a trailing space 7T, and the power level (3) represents a power level at the mark of 5T with a trailing space 3T.

Referring to FIG. 3(f), the power levels of the overwrite pulses vary according to the correlativity between the recording mark and the trailing space thereof. For example, the power levels may be 10 milliwatts (mW), 11 mW and 12 mW, respectively.

In the adaptive recording apparatus shown in FIG. 2, the output characteristics of the LD 160 vary according to the length of time for which the LD 160 has been used. The operating temperature of the laser diode 160 varies according to the time of use.

FIG. 4 graphically shows the output characteristics of the LD 160, in which FIG. 4(a) shows the output characteristic at 25° C., and FIG. 4(b) shows the output characteristic at 60° C., respectively. FIG. 4(a) shows the properties of input/output at the temperature of 25° C., at which the laser diode 160 is initially operated. FIG. 4(b) shows the properties of input/output at the temperature of 60° C., at which the laser diode 160 has been used for a particular period of time.

The shapes of the characteristic curves shown in FIGS. 4(a) and 4(b), which represent the relationship between the light output control data and the power levels of the overwrite pulses, are different. Referring to FIGS. 4(a) and 4(b), the light output control data when the LD 160 operates at 60° C. is larger than that when the LD 160 operates at 25° C., when the overwrite pulse power levels for both cases are equal. Thus, in order to attain more accurate adaptive recording, the light output control data of the power table storing unit 104 must be adjusted according to a variation in the output characteristic of the LD 160.

However, since the adaptive recording apparatus shown in FIG. 2 does not cover the output characteristics of the LD 160, it is difficult to perform accurate recording control.

To solve this problem, the light output control data corresponding to the power setting values are updated according to the output characteristics of the LD 160.

First, the output characteristic curves of the LD 160 are obtained using the ALPC circuit 200. In detail, two reference points a and b are set within the range of the output power level of the LD 160, and reference light output control data Pa and Pb for obtaining the power levels corresponding to the reference points a and b are obtained by applying voltages V_ref_a and V_ref_b corresponding the reference points a and b to the comparator 206 of the ALPC circuit 200 as reference voltages, and obtaining the counting results of the up/down counter 208 of the ALPC circuit 200.

Approximate output characteristic curves of the LD 160 are obtained from the obtained reference light output control data Pa and Pb.

Next, referring to the obtained approximate output characteristic curves, the light output control data corresponding to the power setting values depending on the correlativity are obtained and stored in a separate power table storing unit.

Finally, during adaptive recording, the power of the LD 160 is controlled using the light output control data stored in the power table storing unit.

Now, an adaptive recording method and an apparatus suitable for implementing the same will be described in detail with reference to the accompanying drawings. The lengths of the marks and the lengths of the spaces are important. The heat accumulated in a mark portion when the mark is formed is affected by the lengths of the spaces positioned in front of and to the rear of the mark.

Figure 5:
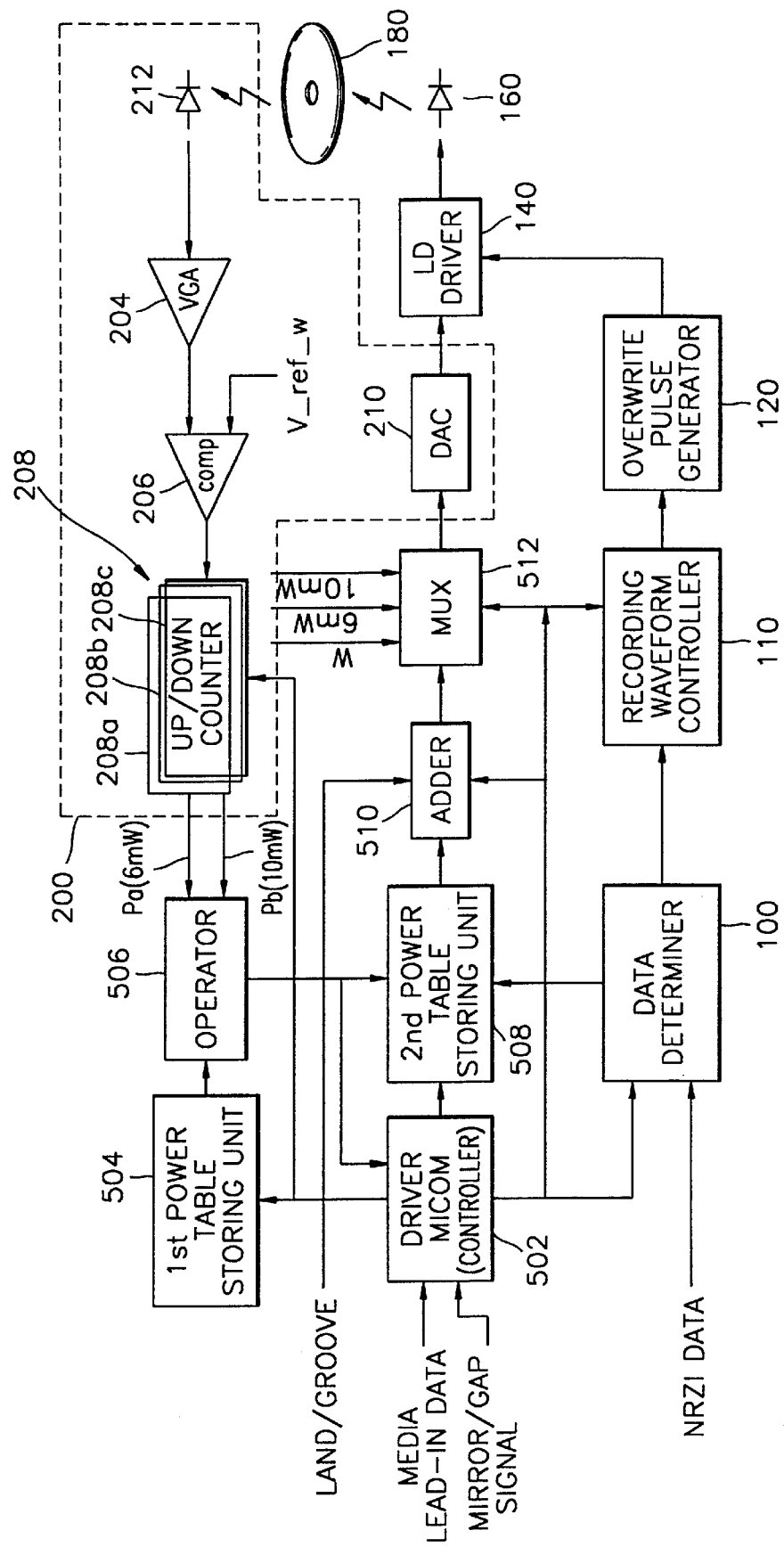
FIG. 5 is a block diagram illustrating an adaptive recording apparatus according to the present invention.

FIG. 5 is a block diagram illustrating an adaptive recording apparatus according to the present invention. In FIG. 5, the same functional elements as those shown in FIG. 2 are designated by the same reference numerals, and a detailed explanation thereof will be omitted.

In FIG. 5, reference numeral 502 denotes a driver micom 502, reference numeral 504 denotes a first power table storing unit, reference numeral 506 denotes a second power table storing unit, reference numeral 510 denotes an adder and reference numeral 512 denotes a multiplexer (MUX).

The first power table storing unit 504 stores power setting values recorded in a read in/out region of the disc 180.

An up/down counter 208 includes three up/down counters 208a through 208c for use in calculation of first and second reference light output control data and in normal recording, respectively, which are selected by the driver micom 502 according to the operation mode.

An operator 506 operates two reference light output control data Pa and Pb, which are obtained by the first and second up/down counters 208a and 208b, and the light output control data compensated according to a change in the output characteristic of the LD 160 using the power setting values stored in the first power table storing unit 504. The light output control data operated in the operator 506 is recorded in the second power table storing unit 508.

The adder 510 adds the light output control data supplied from the second power table storing unit 508 to a predetermined value depending on the type of a track, that is, land or groove, to then supply the addition result to a MUX 512.

The MUX 512 selects one of the light output control data supplied from the up/down counters 208a through 208c and the adder 510 and supplies the selected data to a DAC 210. The MUX 512 selects the first or second up/down counter 208a or 208b in a compensation mode, selects the third up/down counter 208c in a general recording mode, and selects the adder 510 in an adaptive recording mode.

Now, the operation of the adaptive recording apparatus shown in FIG. 5 will be described in detail.

The apparatus shown in FIG. 5 operates in any one of a power table compensation mode for obtaining light output control data compensated according to a variation in the output characteristic of the LD 160, a general recording mode and an adaptive recording mode. Here, the power table compensation mode is preferably periodically executed.

1) Power Table Compensating Mode

The power table compensation mode is periodically executed. In other words, the output characteristic of the LD 160 is periodically examined and the light output control data of the second power table storing unit 508 is compensated according to the examination result.

In the power table compensation mode, the first reference light output control data Pa and the second reference light output control data Pb are obtained to be supplied to the operator 506, the output characteristic of the LD 160 is examined by referring to the obtained reference light output control data, and the second power table storing unit 508 is updated.

The power table compensation mode is executed in an area of the disc 180, where user data is not recorded, for example, a mirror/gap section of a DVD-RAM disc. In other words, the power table compensation mode is executed in synchronization with a mirror/gap signal indicative of the mirror/gap section, and is preferably executed within the mirror/gap section. The reason of the foregoing is that a mirror section is a region in which data is not recorded and a gap section is a recording region of data except user data, the compensation mode can be executed without affecting the recording operation.

In the power table compensation mode, the output characteristics of the LD 160 are examined and the second power table storing unit 508 is compensated according to the examination result.

Figures 6, 7:
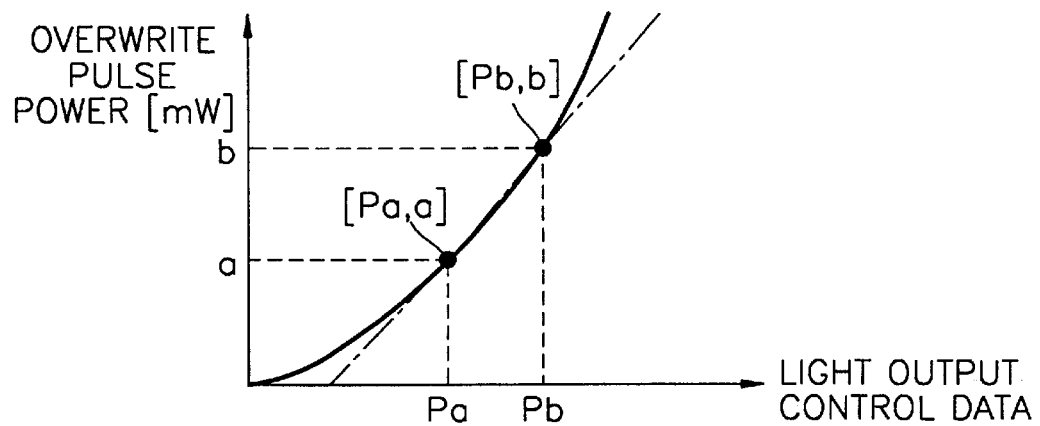
FIG. 6 is a conceptual diagram showing a procedure of inspecting the output characteristics of a laser diode shown in FIG. 5.
FIG. 7 illustrates a procedure of updating light output control data of a second power table storing unit shown in FIG. 5.

FIG. 6 is a conceptual diagram showing a procedure of inspecting the output characteristics of the laser diode 160 shown in FIG. 5. In the present invention, approximation is used for examining the output characteristics of the LD 160. In detail, assuming that the output characteristics of the LD 160 are linear, two reference light output control data Pa and Pb are obtained at two references a and b selected on the y axis indicating the power of the overwrite pulse. An approximate curve of the output characteristics of the LD 160 is obtained from two references a and b and the corresponding reference light output control data Pa and Pb. In other words, a straight line connecting the points [Pa, a] and [Pb, b] is obtained and assumed to be an approximate output characteristic curve.

In examining the output characteristics of the LD 160, the driver micom 502 examines the first reference light output control data Pa at the first reference a and then examines the second reference light output control data Pb at the second reference b, thereby obtaining the output characteristic curve of the LD 160 by referring to the first reference light output control data Pa and the second reference light output control data Pb obtained at the first reference a and the second reference b, respectively.

In the apparatus shown in FIG. 5, it is assumed that the dynamic power of the LD 160 ranges from 2 to 15 mW, the power level of the first reference a is 6 mW and the second reference b is 10 mW. In order to obtain the corresponding power levels of the first and second references a and b, the reference light output control data Pa and Pb to be applied to the LD 160 are obtained. The ALPC circuit 200 is involved in examining the reference light output control data Pa and Pb at the first and second references a and b.

First, the first reference light output control data Pa of the first reference a (6 mW) is obtained as follows. The driver micom 502 makes the first up/down counter 208a operate and makes the MUX 512 select the output of the first up/down counter 208a. Then, the driver micom 502 applies to the comparator 206 a reference voltage V_ref_6 mW for determining the first reference a of 6 mW.

In response to the operation of the ALPC circuit 200, the first reference light output control data Pa for obtaining the power level of the overwrite pulse corresponding to first reference of 6 mW is obtained in the first up/down counter 208a to then be supplied to the operator 506. This operation is performed in the mirror/gap section.

Next, the second reference light output control data Pb of the first reference b (10 mW) is obtained as follows. The driver micom 502 makes the second up/down counter 208b operate and makes the MUX 512 select the output of the second up/down counter 208b. Then, the driver micom 502 applies to the comparator 206 a reference voltage V_ref_10 mW for determining the first reference b of 10 mW.

In response to the operation of the ALPC circuit 200, the second reference light output control data Pb for obtaining the power level of the overwrite pulse corresponding to second reference of 10 mW is obtained in the second up/down counter 208b to then be supplied to the operator 506. This operation is also performed in the mirror/gap section.

The procedure of obtaining the output characteristic curve of the LD 160 by referring to the first reference light output control data Pa and the second reference light output control data Pb obtained at the first reference a and the second reference b, will now be described.

The operator 506 obtains the approximate output characteristic curve by the known method shown in FIG. 6 by referring to the first reference light output control data Pa and the second reference light output control data Pb obtained at the first reference a and the second reference b. In detail, the coordinates [Pa, a] defined by the first reference a and the first reference light output control data Pa, and the coordinates [Pb, b] defined by the second reference b and the second reference light output control data Pb are linearly connected to each other to obtain the approximate output characteristic curve.

Next, the light output control data of the second power table storing unit 508 is updated based on the obtained approximate output characteristic curve.

The power level of the overwrite pulse is compensated in accordance with all possible combinations of the length of a recoding mark and the length of leading/trailing space.

Also, compensation is preferably made on the first pulse, the last pulse and the multi and the multi-pulse chain, respectively. However, in the present invention, the power levels of the first pulse and the last pulse, for example, are compensated. Also, the compensation degrees of the first and last pulses may be different from each other. However, in the present invention, it has been illustrated that the power levels of the first and last pulses are equally compensated.

In the DVD-RAM, the length of the shortest pulse of a NRZI signal is 3T (Here, T is a period of a system clock signal.) and that of the longest pulse of the NRZI signal is 14T. Therefore, there are $12^2$ possible combinations of the length of a recoding mark and the length of leading/trailing space. Thus, the size of a power table for covering all possible combinations increases and the system load increases. Accordingly, the length of a recording mark and the length of trailing space are classified into several representative types, for example, four types being: the shortest pulse, the short pulse, the middle pulse and the long pulse, for easier processing. Then, a power table for compensated power levels of 16 (4×4)kinds of combinations can be used.

FIG. 7(a) shows the content of the power table in which the compensated power levels of the representative combinations, in which the power level of the last pulse is adjusted according to the length of a recording mark and the length of trailing space. In FIG. 7(a), G1, G2, G3 and G4 represent the shortest pulse (3T), the short pulse (4T), the middle pulse (5T) and the long pulse (6T to 14T), respectively.

In FIG. 7(a), the combinations of the lengths of recording mark and trailing space are shown in the left column, and the power setting values in the corresponding combinations are enumerated in the right column. The power setting values are recorded in the first power table storing unit 504 by the driver micom 502 when the driver initially operates.

FIG. 7(b) shows the light output control data compensated responsive to a variation in the output characteristic of the LD 160. The operator 506 prepares the approximate output characteristic curve using the reference light output control data and updates the light output control data corresponding to the power setting values by referring to the prepared approximate output characteristic curve. The updated light output control data are stored in the second power table storing unit 508. The updating operation is repeatedly performed. The second power table storing unit 508 is referred to when the data is recorded by the adaptive recording mode.

Although FIGS. 7(a) and 7(b) illustrate an example of an adaptive recording method depending on the correlativity between the recording mark and the trailing space, it should be noted that the adaptive recording method may depend on the correlativity between the recording mark and the leading space or the leading/trailing spaces.

Figure 8:
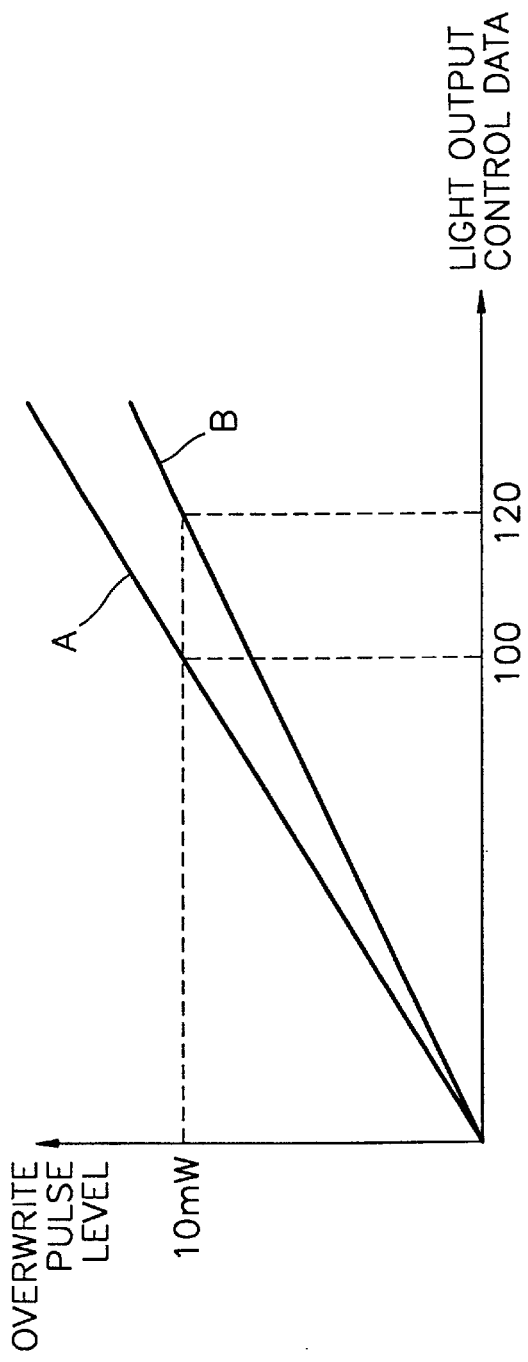
FIG. 8 graphically illustrates a procedure of updating light output control data.

FIG. 8 graphically illustrates a procedure of updating light output control data, in which the curve A is an approximate output characteristic curve obtained at 25° C. and the curve b is an approximate output characteristic curve obtained at 60° C.

The contents recorded in the first power table storing unit 504 are data indicating the power level of an overwrite pulse to be set in the corresponding correlativity. For example, in the first line of FIG. 7(a), when the lengths of recording mark and trailing space are both $G_1$, i.e., $G_1$—$G_1$, the power level of the last pulse is to be set to 10 mW.

Referring to the curve A of FIG. 8, the light output control data for 10 mW of the power level of the LD 160 is 100. However, referring to the curve B of FIG. 8, the light output control data for the same power level is 120.

Since the output characteristic is dependent on the temperature and the temperature is subject to change at any time, the output characteristic of the LD 160 changes at any time. In performing adaptive recording, the light output control data must be changed according to changes in the output characteristic of the LD 160.

The operator 506 performs an operation on the light output control data compensated with respect to the correlativity by referring to the approximate output characteristic curves and stores the operation result in the second power table storing unit 508. During the adaptive recording operation, the second power table storing unit 508 is referred to.

In the present invention, the first power table storing unit 504 and the second power table storing unit 508 are separately provided for storing initial data for an adaptive recording method and ensuring responsiveness.

2) Normal Recording Mode

In the general recording mode, the light power level is controlled by the ALPC circuit 200. In this case, a reference voltage V_ref_w supplied by the driver micom 502 is applied to the comparator 206 and the third up/down counter 208c is used.

The recording waveform controller 110 outputs recording waveform control signals, that is, the read power control signal shown in FIG. 3(b), the write power control signal shown in FIG. 3(c) and the bias power control signal shown in FIG. 3(d), according to NRZI data shown in FIG. 3(a).

The overwrite pulse generator 120 generates overwrite pulses shown in FIG. 3(e), according to recording waveform control signals supplied from the recording waveform controller 110, and applies the same to the LD driver 140.

The LD driver 140 drives the LD 160 according to the overwrite pulses applied thereto and the light output control data supplied from the DAC 210. The overwrite pulses supplied to the LD 160 are flashed onto the disc 180 to perform recording of data. Data is recorded on the disk 180 by the overwrite pulses generated in the LD 160.

3) Adaptive Recording Mode

In the adaptive recording mode, the output levels of the LD 160 are adjusted by referring to the compensated light output control data stored in the second power table storing unit 508.

In the adaptive recording mode, setting the power levels of overwrite pulses is achieved by the data determiner 100, the second power table storing unit 508, the adder 510, the MUX 512, the DAC 210 and the LD driver 140.

The data determiner 100 receives NRZI data, determines the correlativity between the length of the recording mark and the length of leading/trailing space, and supplies the determination result to the second power table storing unit 508. The second power table storing unit 508 outputs the light output control data of the corresponding correlativity to the adder 510 by referring to the determination result supplied from the data determiner 100.

The adder 510 adds the light output control data output from the second power table storing unit 508 to the light output control data depending to the land/groove. In the case of a DVD-RAM, since there is a difference in the light sensitivity between a land track and a groove track, the power table storing unit for use in land and groove must be separately installed. However, the difference in the light sensitivity between a land track and a groove track is about 0.5 mW, which is substantially constant throughout the disk. Thus, the light output control data corresponding to 0.5 mW is added for each land/groove track, thereby obviating the hardware burden due to the demand for separately installing the second power table storing unit 508 for land/groove use.

The adder 510 outputs only the light output control data supplied from the second power table storing unit 508 or outputs light output control data obtained by adding a constant value (light output control data corresponding to about 0.5 mW) to the same according to a land/groove signal. The land/groove signal is generated in a tracking controller (not shown).

The addition result of the adder 510 is supplied to the LD driver 140 via the MUX 512 and the DAC 210. The LD driver 140 controls the levels of the overwrite pulses output from the LD 160 according to the light output control data supplied from the DAC 210.

The driver micom 502 initializes the determination conditions of the data determiner 100, the first power table storing unit 504 and the second power table storing unit 508. In the initializing operation, the power setting values read from the lead-in/out zone of the disk 180 are stored in the first power table storing unit 504, and the light output control data corresponding to the power setting values stored in the first power table storing unit 504 is stored in the second power table storing unit 508. However, after the power table compensation mode is performed, the second power table storing unit 508 stores the light output control data updated according to the output characteristics of the LD 160.

The recording waveform controller 110 outputs recording waveform control signals, that is, the read power control signal shown in FIG. 3(b), the write power control signal shown in FIG. 3(c) and the bias power control signal shown in FIG. 3(d), according to NRZI data shown in FIG. 3(a).

The overwrite pulse generator 120 generates overwrite pulses shown in FIG. 3(e), according to recording waveform control signals supplied from the recording waveform controller 110, and applies the same to the LD driver 140.

The LD driver 140 drives the LD 160 according to the overwrite pulses applied thereto and the light output control data supplied from the DAC 210.

In the adaptive recording mode, the ALPC circuit 200 performs an ALPC operation, like in the general recording mode. Since the counted values of the third up/down counter 208c are changed by adjusting the light output levels in the adaptive recording mode, the normal recording mode may be affected. However, in the general adaptive recording mode, level adjustment is performed with respect to the first and last pulses of the overwrite pulses. The periods of the first and last pulses are shorter than those that can be managed by the ALPC circuit 200. Thus, the third up/down counter 208c is little affected by the level adjustment of the first and last pulses. If affected, since the effect of the level adjustment is distributed throughout several adjacent recording marks, the effect is negligible.

In order to prevent the ALPC circuit 200 from being affected by the adaptive recording mode, while the adaptive recording is performed, the operation of the ALPC circuit 200 may be disabled.

The following Table 1 shows the types of adaptive recording modes.

TABLE 1

|  | b1 | b2 | Type of adaptive recording mode |
|---|---|---|---|
| AP_TYPE[b1, b2] | 0 | 0 | First pulse |
|  | 0 | 1 | Last pulse |
|  | 1 | 0 | First pulse, last pulse |
|  | 1 | 1 | First pulse, multi-pulse, last pulse |

Figure 9:
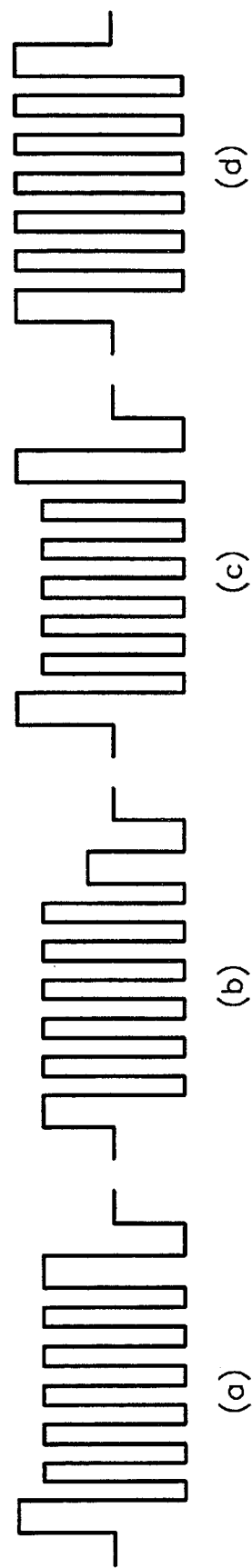
FIG. 9 shows waveform diagrams for illustrating the operation of the adaptive recording apparatus shown in FIG. 5.

FIG. 9 shows waveform diagrams of overwrite pulses according to the adaptive recording mode based on Table 1. In the adaptive recording mode, the levels of the overwrite pulses adaptively vary, as shown in FIG. 9. FIG. 9(a) shows overwrite pulses in the case of varying the level of the first pulse according to the correlativity between the recording mark and the leading space, that is, in the case of AP_TYPE [0, 0], FIG. 9(b) shows overwrite pulses in the case of varying the level of the last pulse according to the correlativity between the recording mark and the trailing space, that is, in the case of AP_TYPE[0, 1], FIG. 9(c) shows overwrite pulses in the case of varying the levels of the first and last pulses according to the correlativity between the recording mark and the leading/trailing spaces, that is, in the case of AP_TYPE[1, 0], and FIG. 9(d) shows overwrite pulses in the case of varying the levels of all pulses according to the correlativity between the recording mark and the leading/ trailing spaces, that is, in the case of AP_TYPE[1, 1], which is related to only the length of the recording mark. In FIG. 9(a), it appears that the first pulse has a level higher than the multi-pulse row and the last pulse. In FIG. 9(b), it appears that the last pulse has a level lower than the first pulse and the multi-pulse row. In FIG. 9(c), it appears that the first and last pulses have levels higher than the multi-pulses have levels higher than the multi-pulse row. In FIG. 9(d), it appears that every pulse has a level higher than the multi-pulse row of FIG. 9(c).

As described above, the adaptive recording method according to the present invention allows accurate recording control by updating the light output control data for the power setting values as the output characteristics of a laser diode change.

Also, the power of overwrite pulses can vary adaptively according to the lengths of recording marks and spaces.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method, comprising:
    recording binary data corresponding to marks and spaces on an optical recording medium, said recording comprising:
        irradiating a light signal onto the optical recording medium; and
        adjusting power of said light signal in dependence upon a relationship between at least two of a mark being recorded, a leading space preceding said mark, and a trailing space following said mark, said adjusting of said light signal being in dependence upon said relationship between at least two of a length of said mark, a length of said leading space, and a length of said trailing space, said adjusting further comprising:
            detecting output characteristics data of a light output unit generating said light signal; and
            controlling said power of said light signal in dependence upon said relationship and said output characteristics data, said detecting further comprising:
                obtaining first reference light output control data for outputting a light signal having a first reference power from said light output unit;
                obtaining second reference light output control data for outputting a light signal having a second reference power from said light output unit; and
                approximating said output characteristics data of said light output unit in dependence upon said first reference power, said first reference light output control data, said second reference power, and said second reference light output control data.

2. The method of claim 1, said obtaining being performed in an area of the optical recording medium where user data is not recorded.

3. The method of claim 1, said approximating corresponding to forming an approximated output characteristic correlation among a power and light output control data corresponding to said light output unit.

4. The method to claim 3, said approximated correlation being obtained by forming an imaginary line connecting a first data point corresponding to said first power and said first light output control data, and a second data point corresponding to said second power and said second light output control data.

5. A method, comprising:
    recording binary data corresponding to marks and spaces on an optical recording medium, said recording comprising:
        irradiating a light signal onto the optical recording medium; and
        adjusting power of said light signal in dependence upon a relationship between at least two of a mark being recorded, a leading space preceding said mark, and a trailing space following said mark, said adjusting of said light signal being in dependence upon said relationship between at least two of a length of said mark, a length of said leading space, and a length of said trailing space, said adjusting further comprising:
            detecting output characteristics data of a light output unit generating said light signal; and
            controlling said power of said light signal in dependence upon said relationship and said output characteristics data, said controlling further comprising:
                obtaining the light output control data applied to said light output unit for generating light signals having power levels corresponding to power setting values in dependence upon said relationship;
                storing said light output control data;
                determining said relationship between at least two of said mark, said leading space, and said trailing space; and
                supplying said light output control data corresponding to said relationship to said light output unit.

6. The method of claim 5, said obtaining and said storing being periodically performed.

7. The method of claim 5, the optical recording medium including a first type of track having a first sensitivity to light and a second type of track having a second sensitivity to light, a difference between said first and second sensitivities to light being substantially constant.

8. The method of claim 7, further comprising:
    adding said corresponding light output data to said difference between said first and second sensitivities to light.

9. A method, comprising:
    recording binary data corresponding to marks and spaces on an optical recording medium, said recording comprising:
        irradiating a light signal onto the optical recording medium; and
        adjusting power of said light signal in dependence upon a relationship between at least two of a mark being recorded, a leading space preceding said mark, and a trailing space following said mark, said adjusting of said light signal being in dependence upon said relationship between at least two of a length of said mark, a length of said leading space, and a length of said trailing space, said adjusting further comprising:
            detecting output characteristics data of a light output unit generating said light signal; and controlling said power of said light signal in dependence upon said relationship and said output characteristics data, said detecting being periodically performed.

10. A method, comprising:

recording binary data corresponding to marks and spaces on an optical recording medium, said recording comprising:
- irradiating a light signal onto the optical recording medium; and
- adjusting power of said light signal in dependence upon a relationship between at least two of a mark being recorded, a leading space preceding said mark, and a trailing space following said mark, said adjusting of said light signal being in dependence upon said relationship between at least two of a length of said mark, a length of said leading space, and a length of said trailing space, said adjusting further comprising:
  - detecting output characteristics data of a light output unit generating said light signal; and
  - controlling said power of said light signal in dependence upon said relationship and said output characteristics data, the optical recording medium having an area where user data is not recorded, and said detecting being performed in said area.

11. A method, comprising:

recording binary data corresponding to marks and spaces on an optical recording medium, said recording comprising:
- irradiating a light signal onto the optical recording medium; and
- adjusting power of said light signal in dependence upon a relationship between at least two of a mark being recorded, a leading space preceding said mark, and a trailing space following said mark, said adjusting of said light signal being in dependence upon said relationship between at least two of a length of said mark, a length of said leading space, and a length of said trailing space, said adjusting further comprising:
  - detecting output characteristics data of a light output unit generating said light signal; and
  - controlling said power of said light signal in dependence upon said relationship and said output characteristics data, the optical recording medium being a digital versatile disc-random access memory disk having a mirror area, said mirror area being an area in which data is not recorded, said detecting being performed in said mirror area of the digital versatile disc-random access memory disk.

12. A method, comprising:

recording binary data corresponding to marks and spaces on an optical recording medium, said recording comprising:
- irradiating a light signal onto the optical recording medium; and
- adjusting power of said light signal in dependence upon a relationship between at least two of a mark being recorded, a leading space preceding said mark, and a trailing space following said mark, said adjusting of said light signal being in dependence upon said relationship between at least two of a length of said mark, a length of said leading space, and a length of said trailing space, said adjusting further comprising:
  - detecting output characteristics data of a light output unit generating said light signal; and
  - controlling said power of said light signal in dependence upon said relationship and said output characteristics data, the optical recording medium being a digital versatile disc-random access memory disk having a gap area, said gap area being an area in which data is not recorded, said detecting being performed in said gap area of the digital versatile disc-random access memory disk.

13. A method of writing binary data to an optical recording medium, comprising:

controlling an adaptive recording apparatus including a recording waveform generator generating an overwrite pulse control signal corresponding to said binary data having marks and spaces, a laser diode driver regulating a laser diode to generate overwrite pulses corresponding to said overwrite pulse control signal and regulating power of said overwrite pulses according to light output control data, an auto laser diode power control circuit feed-back regulating said power of said overwrite pulses to be maintained at a predetermined reference value, a data determiner determining a correlativity between at least two of a mark being recorded, a leading space, and a trailing space, a power table storing unit storing light output control data corresponding to said power of said overwrite pulses in dependence upon said determined correlativity and outputting said corresponding light output control data according to said determined correlativity, and a multiplexer selectively supplying said light output control data output from a power table storing unit to said laser diode driver, said adaptive recording apparatus adaptively adjusting said power of said overwrite pulses according to said determined correlativity between at least two of a length of said mark, a length of said leading space, and a length of said trailing space, said controlling further comprising:
- detecting output characteristic data of said laser diode by regulating said auto laser diode power control circuit; and
- updating said light output control data stored in said power table storing unit in dependence upon said output characteristic data of said laser diode.

14. The method of claim 13, said detecting further comprising:
- applying a first reference value to said auto laser diode power control circuit causing said overwrite pulses to have a first power, and obtaining first reference light output control data corresponding to said overwrite pulses having said first power;
- applying a second reference value to said auto laser diode power control circuit causing said overwrite pulses to have a second power, and obtaining second reference light output control data corresponding to said overwrite pulsed having said second power; and
- approximating said output characteristic data of said laser diode in dependence upon said first power, said first light output control data, said second power, and said second light output control data.

15. The method of claim 14, said applying and said obtaining being performed in an area of the optical recording medium where user data is not recorded.

16. The method of claim 14, said approximating corresponding to forming an approximated output characteristic correlation among a power and light output control data corresponding to said laser diode.

17. The method of claim 16, said approximated correlation being obtained by forming an imaginary line connecting a first data point corresponding to said first power and said first light output control data, and a second data point corresponding to said second power and said second light output control data.

18. The method of claim 13, the optical recording medium including a first type of track having a first sensitivity to light and a second type of track having a second sensitivity to light, a difference between said first and second sensitivities being substantially constant.

19. The method of claim 18, further comprising:
adding said corresponding light output data to said difference between said first and second sensitivities to light.

20. The method of claim 13, said detecting being periodically performed.

21. The method of claim 13, said detecting being performed in an area of the optical recording medium where user data is not recorded.

22. The method of claim 13, the optical recording medium being a digital versatile disc-random access memory disk having a mirror area, said mirror area being an area in which data is not recorded, said detecting being performed in said mirror area of the digital versatile disc-random access memory disk.

23. The method of claim 13, the optical recording medium being a digital versatile disc-random access memory disk having a gap area, said gap area being an area in which data is not recorded, said detecting being performed in said gap area of the digital versatile disc-random access memory disk.

24. An adaptive recording apparatus recording binary data on an optical recording medium, comprising:
a recording waveform generator for generating an overwrite pulse control signal corresponding to said binary data having marks and spaces;
a laser diode outputting light;
a laser diode driver for controlling said laser diode to generate overwrite pulses corresponding to said overwrite pulse control signal and controlling power of said overwrite pulses according to light output control data;
an auto laser diode power control circuit for feed-back controlling said power of said overwrite pulses to be maintained at a predetermined reference value;
a data determiner for determining a correlativity between at least two of a mark to be recorded, a leading space preceding said mark, and a trailing space following said mark;
a first power table storing unit for storing said light output control data corresponding to said power of said overwrite pulses depending on said determined correlativity;
an operator for obtaining output characteristic data of said laser diode in dependence upon first reference light output control data and second reference light output control data, and outputting light output control data in dependence upon said output characteristic data;
a second power table storing unit for storing said light output control data output by said operator; and
a multiplexer for selectively supplying light output control data output from one of said auto laser diode power control circuit and said second power table storing unit to said laser diode driver, said apparatus adaptively adjusting said power of said overwrite pulse according to said correlativity between at least two of a length of said recording mark, a length of said leading space, and a length of said trailing space.

25. The apparatus of claim 25, said auto laser diode power control circuit periodically outputting said first reference light output control data and said second reference light output control data, and said operator being synchronized with period of said auto laser diode power control circuit for outputting said first reference light output control data and said second reference light output control data and outputting light output control data corresponding to power setting values stored in said first power table storing unit.

26. The apparatus of claim 25, the optical recording medium being a digital versatile disc-random access memory disk, and said auto laser diode power control circuit being synchronized with a mirror signal indicative of a mirror period of the digital versatile disc-random access memory disk and outputting said first reference light output control data and said second reference light output control data.

27. The apparatus of claim 25, the optical recording medium being digital versatile disc-random access memory disk, and said auto laser diode power control circuit being synchronized with a gap signal indicative of a gap period of the digital versatile disc-random access memory disk and outputting first reference light output control data and said second reference light output control data.

28. The apparatus of claim 26, the optical recording medium including a first type of track having a first sensitivity of light and a second type of track having a second sensitivity to light, a difference between said first second sensitivities being detectable.

29. The apparatus of claim 28, further comprising an adder for adding said light output control data output from said second power table storing unit to light output control data corresponding to said difference between said first and second sensitivities.

30. The apparatus of claim 27, the optical recording medium including a first type of track having a first sensitivity of light and a second type of track having a second sensitivity to light, a difference between said first second sensitivities being detectable.

31. The apparatus of claim 30, further comprising an adder for adding said light output control data output from said second power table storing unit to light output control data corresponding to said difference between said first and second sensitivities.

* * * * *